United States Patent
Mitchell et al.

(10) Patent No.: US 7,698,371 B2
(45) Date of Patent: Apr. 13, 2010

(54) COMMUNICATING BY VIDEO WITHOUT REPLICATING DATA

(75) Inventors: April Slayden Mitchell, Palo Alto, CA (US); William Alex Vorbau, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 693 days.

(21) Appl. No.: 11/581,829

(22) Filed: Oct. 16, 2006

(65) Prior Publication Data
US 2008/0091839 A1    Apr. 17, 2008

(51) Int. Cl.
*G06F 15/16* (2006.01)
(52) U.S. Cl. .................. 709/206; 709/203; 709/219; 709/231; 715/716; 715/751; 707/1
(58) Field of Classification Search .............. 709/204, 709/206, 227, 231, 219; 707/1, 104.1; 715/716, 715/733, 751; 370/259, 328
See application file for complete search history.

(56) References Cited

U.S. PATENT DOCUMENTS

| | | | | |
|---|---|---|---|---|
| 6,705,869 | B2 * | 3/2004 | Schwartz | 434/219 |
| 2004/0107270 | A1 * | 6/2004 | Stephens et al. | 709/219 |
| 2005/0078613 | A1 * | 4/2005 | Covell et al. | 370/260 |
| 2005/0210394 | A1 * | 9/2005 | Crandall et al. | 709/206 |
| 2007/0026958 | A1 * | 2/2007 | Barasch et al. | 473/266 |
| 2007/0282956 | A1 * | 12/2007 | Staats | 709/206 |
| 2008/0037721 | A1 * | 2/2008 | Yao et al. | 379/88.11 |

FOREIGN PATENT DOCUMENTS

GB    2324627    10/1998

OTHER PUBLICATIONS

Ford, J et al-"Resource-limited hyper-reproductions: electronically reproducing and extendinglectures"—Multimedia Tools and Applications vol. 6 No. 2 Mar. 1998-pp. 181-197.

* cited by examiner

Primary Examiner—Ramy M Osman

(57) ABSTRACT

Communicating by video is described. A video of a menu is streamed to a client device. A signal that identifies a selection from the menu is received. A first video associated with the selection is streamed to the client device. The first video is a member of video conversation that may include a number of videos. A second video is received from the client device. The second video is streamed by the client device as it is recorded by the client device. The second video is a response to the first video. The second video is associated with the video conversation.

17 Claims, 5 Drawing Sheets

COMMUNICATING BY VIDEO WITHOUT REPLICATING DATA

TECHNICAL FIELD

Embodiments in accordance with the present invention relate to video sharing.

BACKGROUND ART

Web sites that allow users to upload and view video content are growing in popularity. However, contemporary versions of those Web sites suffer from one or more shortcomings, in particular when it comes to streaming videos to and from mobile (e.g., wireless) devices that may have limited capabilities relative to platforms such as desktop and laptop computers. For instance, the process for uploading videos from a mobile device may be burdensome and may even require the use of a personal computer. Furthermore, contemporary Web sites offer only limited and relatively inflexible options for viewing videos. For instance, they provide all users with a common view of available videos regardless of which videos may actually be of interest to an individual user. Systems such as video mail—in which videos are e-mailed to one or more people—can be used to present different videos to different users, but the choice of who gets what belongs solely to the sender.

Accordingly, there is value to a method or system that can be used to share videos but that does not suffer from the shortcomings of conventional approaches. Embodiments in accordance with the present invention provide this and other advantages.

SUMMARY

Communicating by video is described. In one embodiment, a video of a menu is streamed to a client device. A signal that identifies a selection from the menu is received. A first video associated with the selection is streamed to the client device. The first video is a member of video conversation that may include a number of videos. A second video is received from the client device. The second video is streamed by the client device as it is recorded by the client device. The second video is a response to the first video. The second video is associated with the video conversation.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

The descriptions and examples provided herein are applicable to media data, particularly multimedia data. One example of multimedia data is video data accompanied by audio data. The term "video" is used herein to refer to an instance of multimedia data that includes both video and audio data. Although described in the context of videos, embodiments in accordance with the present invention are well suited for content that includes video data only, audio data only, speech-based data, image-based data, Web page-based data, graphic data and the like, and combinations thereof.

Figure 1:
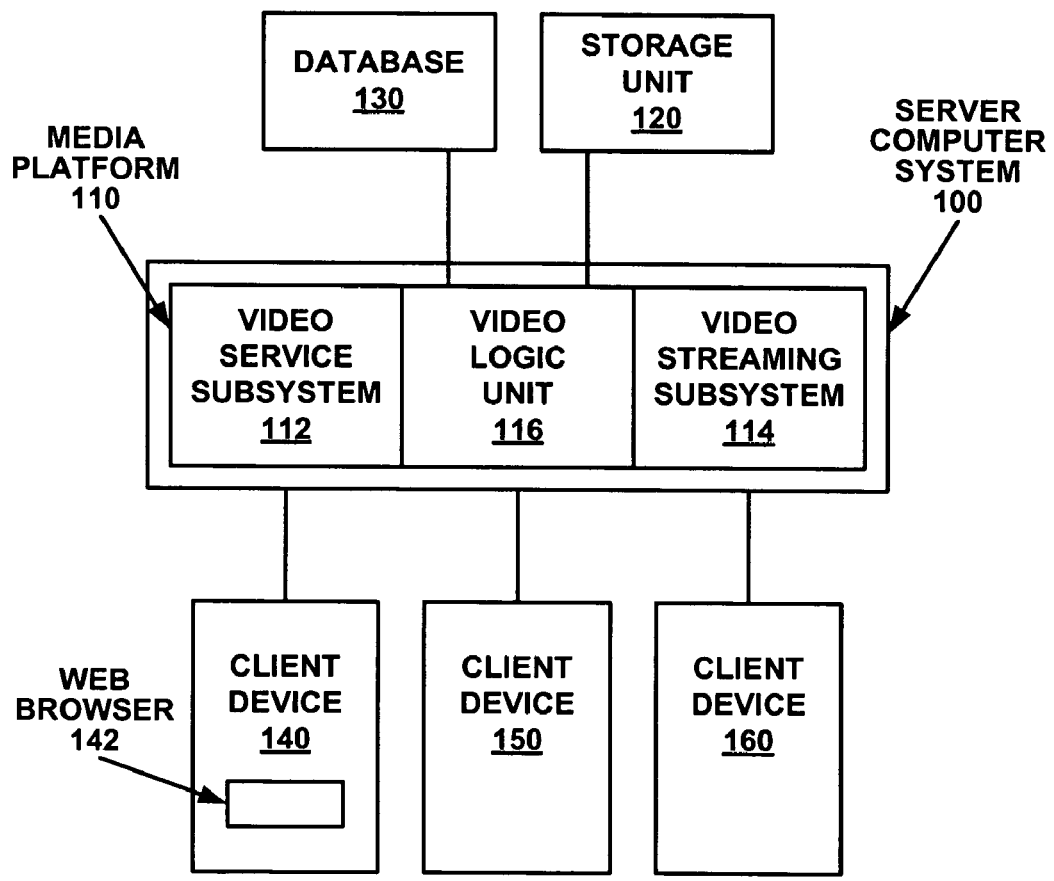
FIG. 1 is a block diagram showing an example of a system upon which embodiments of the present invention can be implemented.

FIG. 1 is a block diagram showing an example of a system upon which embodiments of the present invention can be implemented. In general, the elements of FIG. 1 are described according to the functions they perform. However, elements may perform functions in addition to those described herein. Also, functions described as being performed by multiple elements may instead be performed by a single element. Similarly, multiple functions described as being performed by a single (e.g., multifunctional) element may instead be divided in some way amongst a number of individual elements. Furthermore, the system of FIG. 1 and each of its elements may include elements other than those shown or described herein.

In one embodiment, a media platform 110 is implemented as part of a server computer system 100 that is communicatively coupled to other computer systems in a network (not shown). Server computer system 100 may be an industry-standard server. Instead of being implemented on a single server computer system, media platform 110 may be implemented on separate computer systems in a network.

Media platform 110 can provide a number of services and execute a number of applications including, but not limited to, video content delivery. Media platform 110 also has the capability to receive and interpret dual tone multi-frequency (DTMF) signals.

In the embodiment illustrated in FIG. 1, media platform 110 includes a video service subsystem 112, a video streaming subsystem 114, and a video logic unit 116. Video service subsystem 112, video streaming subsystem 114, and video logic unit 116 may reside on one server computer system or they may be distributed across separate computer systems in a network.

In overview, media platform 110 allows users to create asynchronous conversations using streaming video. Media platform 110 also allows users to organize videos by group or conversation, display videos on a mobile client device via a wireless connection, display videos on a client device via a Web connection, record video replies to prior video postings, and see customized (e.g., user-specific) views of the video conversations.

Each video communication group may include one or more video conversations. Each video conversation (or simply conversation) may also be referred to as a thread. In essence, a conversation includes a first video and a second video in response to the first video, a third video in response to the second video, and so on. Each conversation may consist of one or more videos. Conversations can thus occur asynchronously.

In the FIG. 1 embodiment, video streaming subsystem 114 is used to send (stream) videos from media platform 110 to a client device, and to receive videos sent (streamed) from the client device to media platform 110, using wireless communication protocols. In this embodiment, video service subsystem 112 provides similar services to client devices that communicate using Internet protocols and a Web browser. Video service subsystem 112 may also be referred to as a Web service subsystem or social communication subsystem.

In one embodiment, the videos are stored on a storage unit 120. Storage unit 120 may be a memory unit that is resident on server computer system 100 or it may be a separate unit that is part of a storage area network, for example. There may be any number of such storage units. The video may be compressed (encoded) using any of a variety of encoding standards and compression schemes.

In one embodiment, a database 130 is used to store information about each of the videos stored on the various storage units. Such information can include, but is not limited to, information identifying the author, the date and time the video was created, which group the video was submitted to, and if the video was posted in response to another video (and is therefore associated with a particular conversation). Using the information stored in database 130, video logic unit 116 can construct a video conversation (thread).

In the FIG. 1 embodiment, video logic unit 116 is used to determine, for example, which users belong to which group and which videos are in which conversation. Video logic unit 116 can also be used to organize and maintain other types of information, such as a user's viewing history. Video logic unit 116 precludes the need to replicate data at video service subsystem 112 and at video streaming subsystem 114. Another advantage to video logic unit 116 is that, if storage unit 120 and/or database 130 is changed in some manner (e.g., structure, location, etc.), then video logic unit 116 can be updated, leaving video service subsystem 112 and video streaming subsystem 114 unaffected.

In the example of FIG. 1, three client devices 140, 150 and 160 are shown as being in communication with server computer system 100 (specifically, media platform 110); however, the present invention is not so limited. The client devices 140, 150 and 160 may communicate with server computer system 100 directly via a wired or wireless connection, or indirectly via either a wired or wireless network or a heterogeneous network that includes both wired and wireless components. In other words, although not illustrated in FIG. 1, there may or may not be intervening nodes between the client devices 140, 150 and 160 and the server computer system 100.

In the example of FIG. 1, client device 140 implements a Web browser 142. Client device 140 may also have the capability to receive and play (decode, render and display) videos. Client device 140 may be embodied as a personal computer, for example.

In the example of FIG. 1, client device 150 has the capability to receive and play videos. Client device 150 may be embodied as a media player, for example.

In the example of FIG. 1, client device 160 has the capability to record and send (stream) videos, and to receive and play videos. Client device 160 also may have the capability to function as a cell phone with text messaging and as a personal digital assistant or similar type of device. Client device 160 may be embodied as a smartphone, for example. In one embodiment, client device 160 can generate touch-tone signals (e.g., DTMF codes) using the buttons of a keyboard-like interface, a numeric touchpad or the like. Client device 160 may be known as a third generation (3G) device; that is, client device 160 has the ability to transfer both voice data and non-voice data, even simultaneously. In one embodiment, client device 160 communicates with video streaming subsystem 114 via a Session Initiation Protocol (SIP) connection. However, embodiments in accordance with the present invention are not limited to 3G technology or SIP connections.

Although the elements of FIG. 1 are described above as having various types of capabilities and functions, embodiments in accordance with the present invention are not so limited. The system of FIG. 1 is described below in practice. From that discussion, the various capabilities and functions of the system will be recognized, and it will also be recognized that these capabilities and functions can be achieved using different types and combinations of devices and components.

In one embodiment, video streaming subsystem 114 sends videos stored by media platform 110 to client device 160 and receives videos from client device 160, which are stored by media platform 110. For example, a 3G-compatible device can establish a SIP connection with video streaming subsystem 114 and then exchange videos over that connection.

In one embodiment, client device 160 simultaneously records and transmits (streams) each video. In one such embodiment, the videos recorded by client device 160 are not stored on client device 160 and are stored only by media platform 110 (e.g., on storage unit 120). Accordingly, videos are not unnecessarily replicated on a mobile client device, which may have limited storage capacity.

A user can view videos on client device 160 that were recorded by another user and transmitted to and stored by media platform 110. The user can view videos via a service provider (e.g., a telecom service provider) or via the Web. In one embodiment, the videos are streamed to client device 160 but not stored on client device 160, and so the storage capacity of client device 160 is not an issue.

In one embodiment, media platform 110 (e.g., video streaming subsystem 114 and video logic unit 116) streams a video of a menu to client device 160. The menu can list a number of selections available to a user. For example, upon identification and perhaps authentication of a user by media platform 110 (e.g., video logic unit 116), the user can be presented with the list of groups of which the user is a member. Upon selecting a group, the user can be presented with a list of conversations in the group. Upon selecting a conversation, the user may select a video within the conversation or may be automatically presented with the video most recently posted to that conversation.

A user makes selections by pressing an appropriate key on the client device 160 to generate a respective DTMF code that is sent to and interpreted by video streaming subsystem 114. In a similar manner, a user can control the playback of a video by pressing an appropriate key. For example, a user can stop playing the video, replay it, "rewind" it, or the like. Also, a user can control the recording of a video by pressing an appropriate key. For example, a user can start and stop recording. Moreover, a user can use DTMF codes to associate a recording with a particular group or conversation.

In one embodiment, media platform 110 (e.g., video logic unit 116) creates a customized menu for each user. Each user can thus be presented with a unique view of each video conversation (e.g., group or conversation) based on their preferences and past viewing experiences. The menus can be extended to provide a user with different options for sorting and/or rating videos, including the ability to vote on a video.

As noted above, the menu is streamed to the client device 160, so it is not necessary to have any particular software installed on the device in order to implement the menu. Furthermore, if the menu is to be changed in some manner—either to customize it for a user or to implement a change across all users—it is not necessary to make any changes to information or applications stored on client device 160; instead, the change is instituted at media platform 110.

In one embodiment, as mentioned above, media platform 110 (e.g., video logic unit 116 and video service subsystem 112) provides a Web-based service that allows a user to create and manage video communication groups and conversations using Web browser 142 of client device 140. A user can create a group, invite specific other users to join the group, and manage group activity.

Videos can be sent to client device 140, 150 and/or 160 via a network such as the Internet. Client devices 140, 150 and 160 can also send videos to media platform 110 (e.g., video service subsystem 112) via a network such as the Internet. The customized view and navigation features described above are available whether the videos are viewed via an online connection or via a telecom service provider.

Video conversations (threads) can be presented to a user in different ways. One viewing option presents a user with a list of all videos shared in a particular group based on the order in which the videos were created, allowing the user to view each conversation in the group chronologically. Another viewing option presents a user with a list of videos sorted by conversation. Thus, the user can watch a subset of the videos that belong to a particular group and are related to an originating video. The user can also scroll through the videos, watch each response to the previous video, and see in real time which videos they have already watched.

In one embodiment, media platform 110 (e.g., video service subsystem 112) enables a Real Simple Syndication (RSS) feed for subscription and for downloading video files. Using the RSS feed, a user can synchronize a portable media player (e.g., client device 150) or personal computer (e.g., client device 140), as well as client device 160, with video content available from media platform 110 and browse through the various video conversations offline.

FIGS. 2, 3, 4 and 5 are flowcharts 200, 300, 400 and 500, respectively, of methods for video communication in accordance with various embodiments of the present invention. Although specific steps are disclosed in the flowcharts, such steps are exemplary. That is, embodiments of the present invention are well-suited to performing various other steps or variations of the steps recited in the flowcharts. The steps in the flowcharts may be performed in an order different than presented, and not all of the steps in the flowcharts may be performed. All of, or a portion of, the methods described by the flowcharts may be implemented using computer-readable and computer-executable instructions which reside, for example, in computer-usable media of a computer system. The processes described by flowcharts 200, 300, 400 and 500 can be repeated in entirety or in part as necessary.

The flowcharts of FIGS. 2-5 are described in the context of the example system of FIG. 1; however, as mentioned previously herein, embodiments in accordance with the present invention are not limited to the example of FIG. 1. Also, the discussion below refers to client device 160, although the present invention is not so limited.

Figure 2:
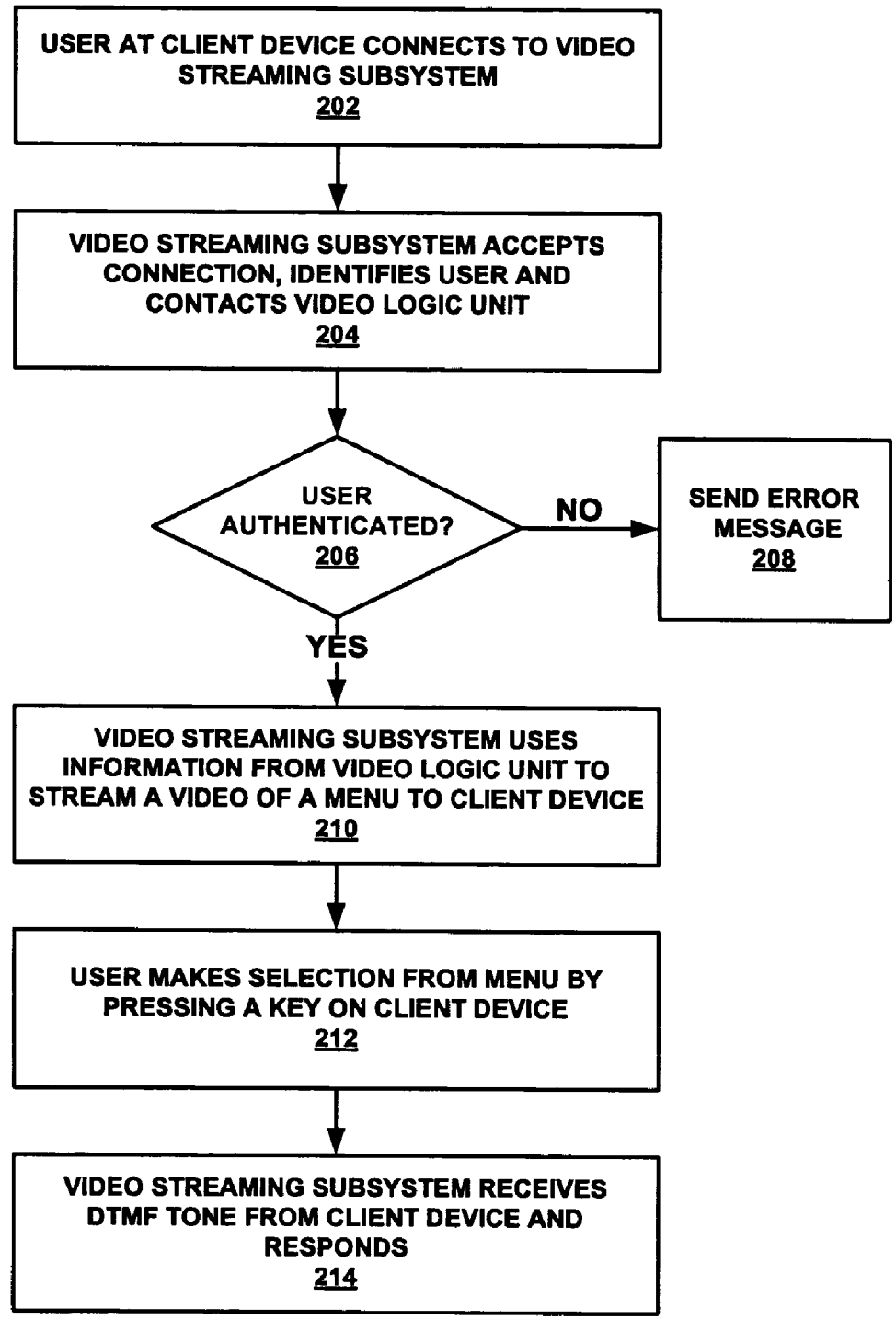
FIGS. 2, 3, 4 and 5 are flowcharts of methods for video communication in accordance with various embodiments of the present invention.

In block 202 of FIG. 2, with reference also to FIG. 1, a user establishes a connection between client device 160 and media platform 110 on server computer system 100, and in particular between client device 160 and video streaming subsystem 114. In one embodiment, the connection is established by means of a dedicated button on client device 160. A user may instead call a specified phone number.

In block 204, video streaming subsystem 114 accepts the connection, identifies the user, and contacts video logic unit 116 to request information that can be used to authenticate the user. Authentication information may be stored in database 130.

In block 206, in one embodiment, the user's identity is authenticated by means of a user identifier (user ID) and password, for example. If the user's identity is not authenticated, an error message can be sent to the client device 160 (block 208). If the user's identity is authenticated, then the flowchart 200 proceeds to block 210.

In block 210, video streaming subsystem 114 receives information from video logic unit 116 that identifies the groups available to the user. Such information may be stored or derived from the information stored in database 130. Each group is identified by a unique name and is, in general, named by the user who established the group. Groups may be named based on the subject matter of their content, their membership, etc. For instance, a group may be named "Vacations" or "Friends."

Using the information from video logic unit 116, a video of a menu that lists the available groups by name can be created. Video streaming subsystem 114 can then stream the video menu to client device 160.

In block 212, a user makes a selection of one of the groups from the menu by pressing an appropriate key on client device 160, thereby generating a touch-tone signal (DTMF code).

In block 214, the touch-tone signal (DTMF code) is received by video streaming subsystem 114.

Figure 3:
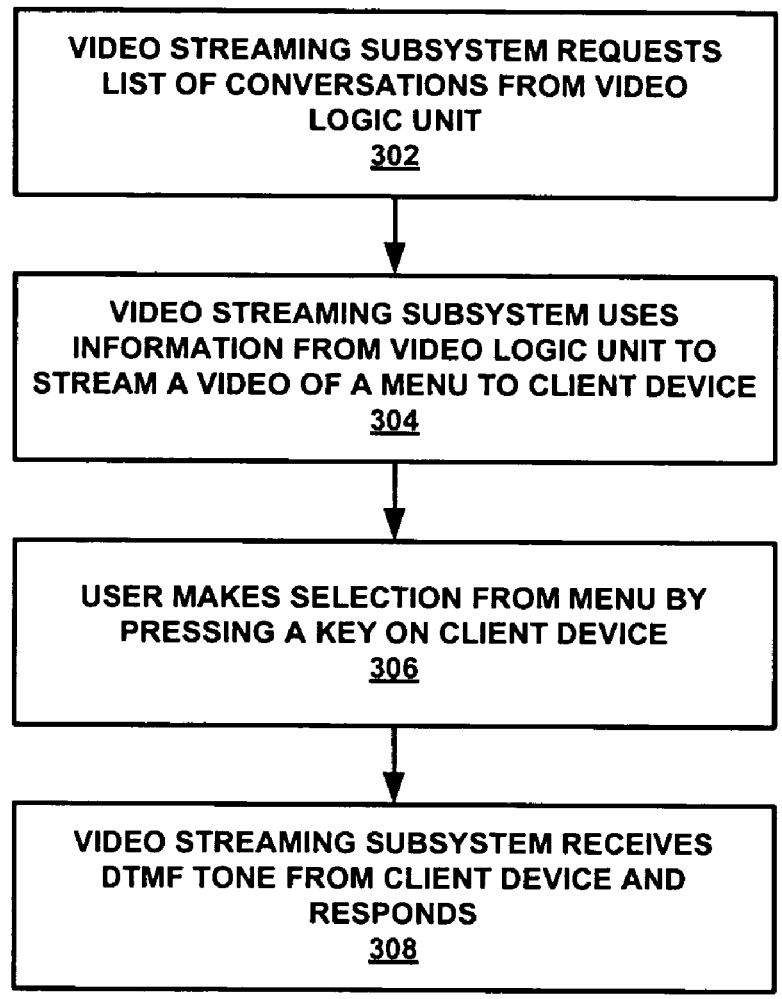

In block 302 of FIG. 3, for the group selected in blocks 212 and 214 of FIG. 2, video streaming subsystem 114 asks video logic unit 116 to provide the list of available conversations. The list of available conversations can be generated based on the information stored in database 130.

In block 304, using the information from video logic unit 116, a video of a menu that lists the available conversations by name can be created. Conversations can be named in a manner similar to the naming of groups. Video streaming subsystem 114 can then stream the video menu to client device 160.

In block 306, the user makes a selection of one of the conversations from the menu by pressing an appropriate key on client device 160, thereby generating a touch-tone signal (DTMF code).

In block 308, the touch-tone signal (DTMF code) is received by video streaming subsystem 114.

Figure 4:
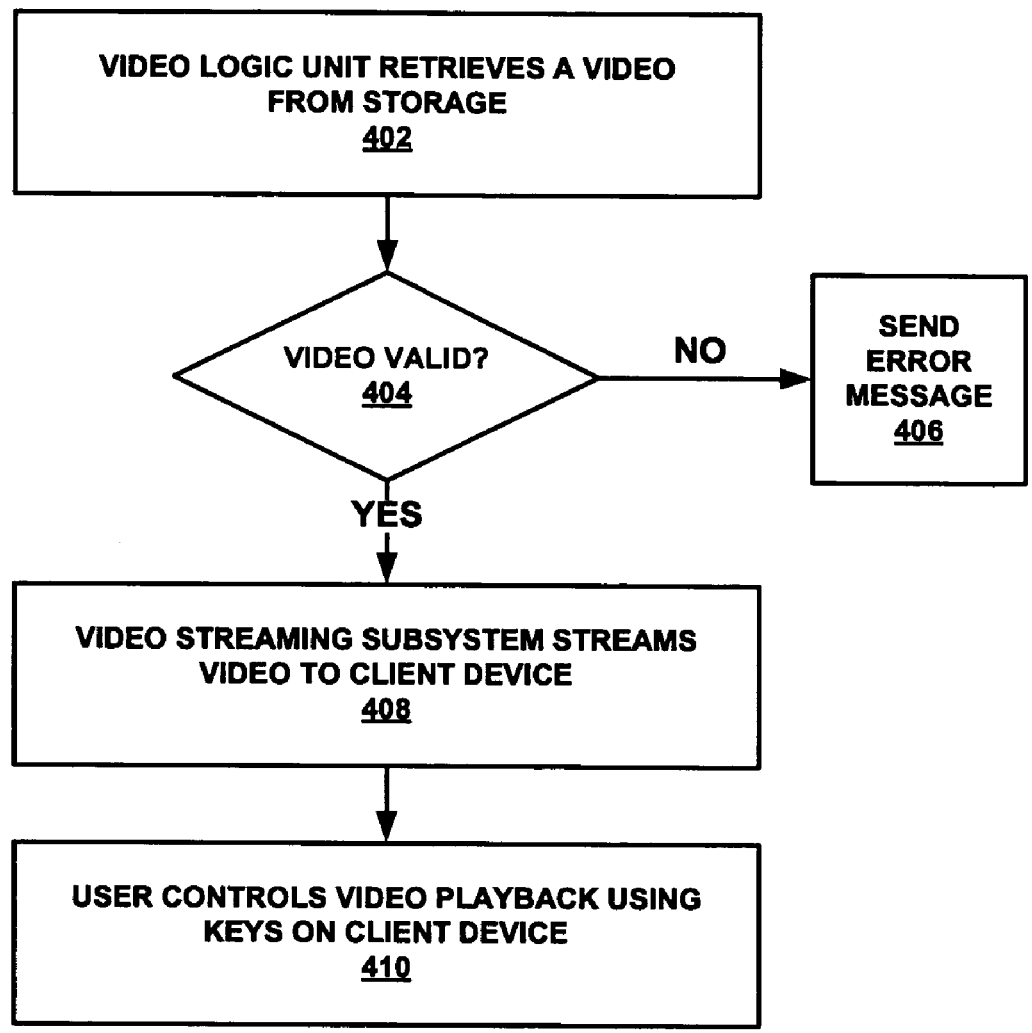

In block 402 of FIG. 4, video streaming subsystem 114 receives a video associated with the conversation identified in blocks 306 and 308 of FIG. 3. The video can be retrieved from storage unit 120 by video logic unit 116. In one embodiment, the video that is retrieved is the most recent video associated with the selected conversation. In another embodiment, the user can specify a particular video by scrolling through another video of a menu that identifies the videos associated with the selected conversation. The latter menu may not necessarily identify the videos by name; instead, a key frame from each video (perhaps the first frame of the video) or the name of the video's author may be displayed, for example.

In block 404, a determination is made as to whether the video is valid. If not, an error message is sent to client device 160 (block 406). Otherwise, flowchart 400 proceeds to block 408.

In block 408, the video retrieved in block 402 is streamed to client device 160 and played as it is received. That is, the video is not stored on client device 160 and then played.

In block 410, the user can control playback of the video by pressing an appropriate key on client device 160, thereby generating a touch-tone signal (DTMF code) that can be sent to video streaming subsystem 114. For instance, the user can stop playing the video, or can perform some other action associated with the playback, by pressing an appropriate key. If no key is pressed, the video plays to completion.

Figure 5:
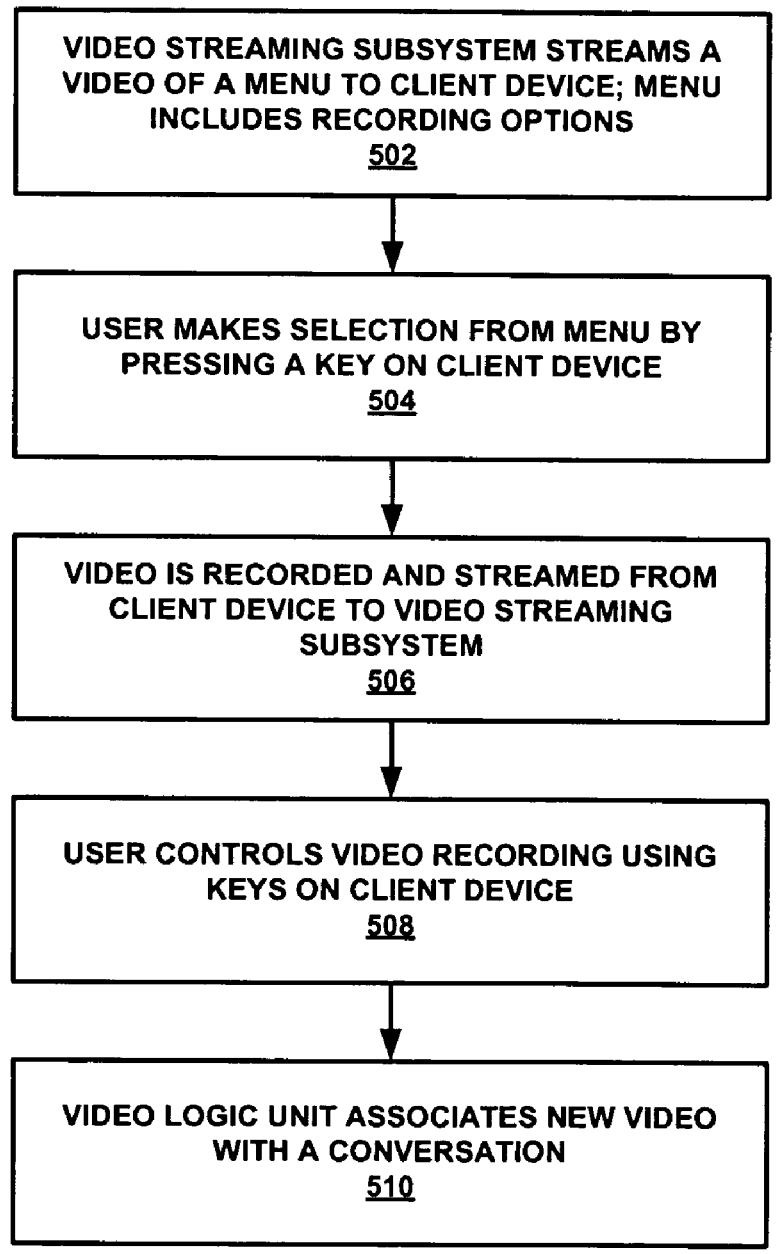

In block 502 of FIG. 5, the user is presented with an opportunity to record and upload (stream) a video in response to the video just played. In one embodiment, when playback of the first video is stopped (at completion or otherwise), a video of a menu is streamed from video streaming subsystem 114 to client device 160, presenting the user with an option to record a video.

In block 504, the user can choose to record and stream a video by pressing the appropriate key on client device 160, thereby generating a touch-tone signal (DTMF code) that can be sent to video streaming subsystem 114.

In block 506, the video is recorded using client device 160 and streamed to video streaming subsystem 114 as it is being recorded. In other words, the video is not recorded and stored on client device 160.

In block 508, the user can control recording of the video by pressing an appropriate key on client device 160, thereby generating a touch-tone signal (DTMF code) that can be sent to video streaming subsystem 114. For instance, the user can stop recording, or can perform some other action associated with the recording, by pressing an appropriate key. If no key is pressed, recording proceeds until it is stopped. In one embodiment, recording is stopped automatically after a prescribed length of time.

In block 510, video streaming subsystem 114 receives the new video streamed from client device 160, and video logic unit 116 associates that video with the current conversation. In one embodiment, this is accomplished by creating a new entry in database 130.

Media platform 110 of FIG. 1 can be enhanced with additional features without a loss of compatibility with legacy devices. In one embodiment, media platform 110 sends a text message to client device 160 in the event a new video is being streamed to, or has been added to, a group or conversation. Thus, even if client device 160 is not connected to video streaming subsystem 114, a user can be alerted to the presence of a new video. In a similar manner, a text message can be sent to client device 160 to notify a user that an existing video is being streamed to another user at another client device.

In another embodiment, knowledge of the various social relationships between users can be utilized to control distribution of a video or to make aspects of a video anonymous. For example, a user can establish criteria at a group level, specifying who can receive certain videos and who cannot. The criteria may be based on the degree of separation between users. A user that may have access to the group but does not meet the specified criteria may be blocked from receiving certain videos in the group. Alternatively, those videos may be transcoded in some manner to make them anonymous—for example, the video may be transcoded into something cartoonish, or it may be heavily pixilated.

In summary, embodiments in accordance with the present invention provide methods and systems for sharing videos (for communicating using videos) that do not share the problems of conventional approaches. Videos can be directly moved to users at mobile client devices to create threads or conversations without an online connection. Users can organize videos by group or conversation, view videos in each particular group or conversation, and record replies to prior video postings using their mobile client devices, thus facilitating social interactions between users, in particular mobile users. Recorded videos are streamed directly from mobile client devices to a server, avoiding the need to store video files on the mobile client devices, and also avoiding the need to transfer the video files to, for example, a personal computer in order to upload the video files via an online connection.

Users can be provided with customized views of their groups, allowing users to identify which videos they have viewed already and to view videos by conversation, not just by group, for example. If one user has watched certain videos in a conversation, and another user has watched a different set of videos in that conversation, the menu sent to the first user will reflect a different viewing history than the menu sent to the second user.

Users can be provided with access to multiple videos, and can pick and choose which videos they wish to view. Instead of owning a single mailbox and only being allowed to view videos sent to that mailbox, users can belong to multiple groups. Users can also serve a dual role in each group, as author and member (viewer). Users can view any video associated with a group (unless restrictions are in place, as described above) and can respond to any video. Instead of a push approach to disseminate videos, a pull approach is used.

Embodiments in accordance with the present invention thus provide a video sharing experience that is easier and inherently more social than contemporary approaches available to mobile users. Each user is given the ability to communicate by video in a trusted community (controlled by user preferences) without having to replicate data or send the data multiple times.

Because the underlying user interface and backend systems are implemented on a server, users do not need to install an application on their mobile client devices. The video communication system is thus flexible and readily extendable, because extra services and features can be implemented at the server instead of on a per-client basis. Through the use of customized menus and DTMF codes, the video streaming process is user-friendly and avoids the need to record the video to file, locate and select the file on a hard drive, and then upload the file.

Embodiments of the present invention are thus described. While the present invention has been described in particular embodiments, it should be appreciated that the present invention should not be construed as limited by such embodiments, but rather construed according to the following claims.

What is claimed is:

1. A method of communicating by video, said method comprising:
    accessing videos:
        storing information associated with said videos in a database, wherein said information comprises preferences and past viewing experiences of said client devices and is used to organize said videos into groups of available selections, said available selections comprising a plurality of videos comprising video conversations, said information being used to control access to said videos according to said preferences and said past viewing experiences of said client devices;
    streaming a video of a customized menu comprising a portion of said groups to a client device of said client devices based on said information, said portion of said groups comprising a listing of groups of video conversations accessible to said client device;
    receiving a signal that identifies a selection from said menu, wherein said selection identifies a group of said listing of groups of video conversations;

streaming to said client device a first video associated with said selection, wherein said first video is a member of said plurality of videos comprising a video conversation corresponding to said listing of groups of video conversations;

receiving from said client device a second video that is streamed from said client device as it is recorded by said client device, wherein said second video is a response to said first video; and associating said second video with said video conversation corresponding to said listing of groups of video conversations.

2. The method of claim 1 further comprising storing said second video.

3. The method of claim 1 wherein said signal comprises a dual tone multi-frequency (DTMF) code.

4. The method of claim 1 wherein said customized menu comprises a listing of video conversations accessible to said client device, wherein said selection identifies said video conversation.

5. The method of claim 1 further comprising receiving from said client device a signal that controls playback of said first video.

6. The method of claim 1 further comprising receiving from said client device a signal that controls recording of said second video.

7. A system for video communication, said system comprising:

a video service subsystem configured for communicating with client devices using Web-based protocols; and a video streaming subsystem communicatively coupled to said video service subsystem, wherein said video streaming subsystem is configured for accessing videos that are organized into groups, storing information associated with said videos in a database, wherein said information comprises preferences and past viewing experiences of said client devices and is used to organize said videos into groups of available selections, said available selections comprising a plurality of videos comprising video conversations, said information being used to control access to said videos according to said preferences and said past viewing experiences of said client devices, and said video streaming subsystem configured for streaming a video of a customized menu comprising a portion of said groups to a client device of said client devices based on said information, said portion of said groups comprising a listing of groups of video conversations accessible to said client device; wherein said video streaming subsystem is also configured for streaming a first video associated with one of said groups to said client device in response to a signal from said client device identifying a choice from said customized menu; and wherein said video streaming subsystem is also configured for associating a second video, streamed from said client device, with said one of said groups of video conversations.

8. The system of claim 7 further comprising a video logic unit coupled to said video service subsystem and said video streaming subsystem, wherein said video logic unit is configured for organizing said videos into said groups and for organizing videos in said groups into video conversations.

9. The system of claim 7 wherein said video service subsystem is accessible using a Web browser.

10. The system of claim 7 wherein said groups include a group comprising a plurality of video conversations, wherein said first video and said second video are associated with a same one of said video conversations and wherein said second video is a response to said first video.

11. The system of claim 7 wherein said video service subsystem is configured for providing a Real Simple Syndication (RSS) feed to said client device.

12. The system of claim 7 further comprising memory for storing said videos including said first and second videos.

13. The system of claim 7 wherein said customized menu comprises a listing of video conversations accessible to said client device, wherein said selection identifies one of said video conversations.

14. The system of claim 7 wherein said customized menu comprises a listing of groups of video conversations accessible to said client device, wherein said selection identifies a group of video conversations.

15. A computer usable storage medium comprising instructions that when executed enable a first client device to communicate by video without replicating data, said method comprising:

accessing videos;

storing information associated with said videos in a database, wherein said information comprises preferences and past viewing experiences of said client devices and is used to organize said videos into groups of available selections, said available selections comprising a plurality of videos comprising video conversations, said information being used to control access to said videos according to said preferences and said past viewing experiences of said client devices;

streaming a video of a customized menu comprising a portion of said groups to a client device of said client devices based on said information, said portion of said groups comprising a listing of groups of video conversations accessible to said client device;

receiving a signal that identifies a selection from said menu, wherein said selection identifies a group of said listing of groups of video conversations;

streaming to a first client device a first video associated with said selection, wherein said first video is a member of said plurality of videos comprising a video conversation corresponding to said listing of groups of video conversations;

streaming a video of a menu to said first client device;

receiving a signal that identifies a selection from said menu, said signal indicating that a second video associated with said video conversation is to be streamed from said first client device, wherein said second video is in response to said first video;

receiving from said first client device said second video that is streamed from said first client device as it is recorded by said first client device; and associating said second video with said video conversation corresponding to said listing of groups of video conversations.

16. The method of claim 15 further comprising sending a message to a second client device, wherein said message indicates that said first video is being streamed.

17. The method of claim 15 further comprising sending a message to a second client device, wherein said message indicates that said second video is being streamed.

* * * * *

UNITED STATES PATENT AND TRADEMARK OFFICE
CERTIFICATE OF CORRECTION

| | | |
|---|---|---|
| PATENT NO. | : 7,698,371 B2 | Page 1 of 1 |
| APPLICATION NO. | : 11/581829 | |
| DATED | : April 13, 2010 | |
| INVENTOR(S) | : April Slayden Mitchell et al. | |

It is certified that error appears in the above-identified patent and that said Letters Patent is hereby corrected as shown below:

In column 8, line 50, in Claim 1, delete "videos:" and insert -- videos; --, therefor.

Signed and Sealed this

Fifth Day of October, 2010

David J. Kappos
*Director of the United States Patent and Trademark Office*